Sept. 7, 1954  R. W. BOYD ET AL  2,688,178
RADIATOR FIN ASSEMBLING MACHINE
Filed Sept. 29, 1951  6 Sheets-Sheet 3

Inventors.
Roy W. Boyd
August Van Vooren
Harold Ruehl
Paul O. Pippel
Atty.

Inventors.
Roy W. Boyd
August Van Vooren
Harold Ruehl
Paul O. Pippel
Atty.

Sept. 7, 1954  R. W. BOYD ET AL  2,688,178
RADIATOR FIN ASSEMBLING MACHINE
Filed Sept. 29, 1951  6 Sheets-Sheet 6
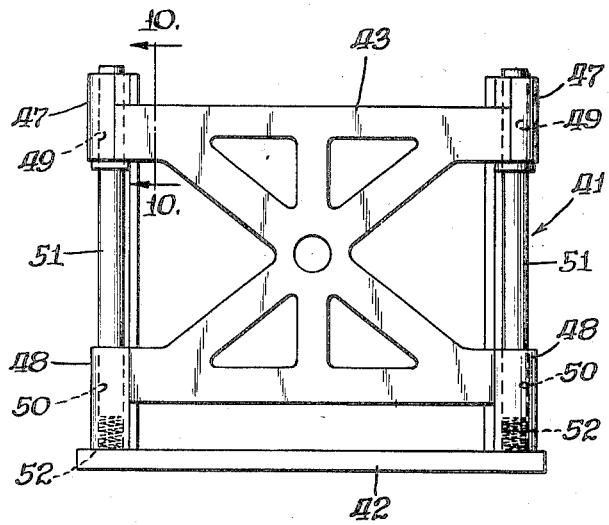
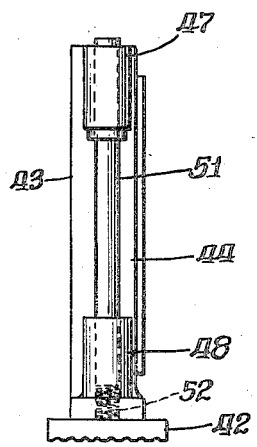
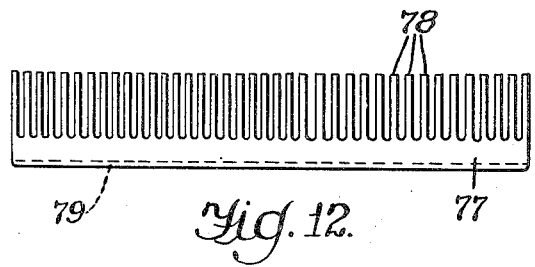
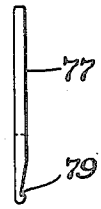
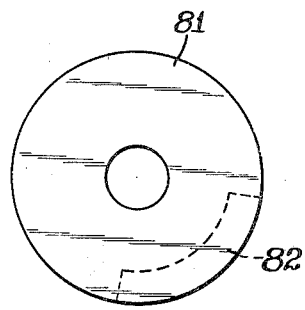
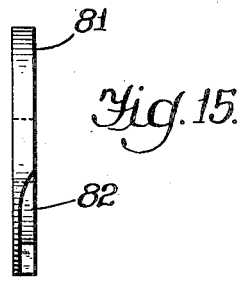
Inventors.
Roy W. Boyd
August Van Vooren
Harold Ruehl
Paul O. Pippel
Atty.

Patented Sept. 7, 1954

2,688,178

UNITED STATES PATENT OFFICE 2,688,178

RADIATOR FIN ASSEMBLING MACHINE

Roy W. Boyd, Chicago, August Van Vooren, Evanston, and Harold Ruehl, Chicago, Ill., assignors to International Harvester Company, a corporation of New Jersey Application September 29, 1951, Serial No. 248,924

18 Claims. (Cl. 29—33)

1

This invention relates to a radiator manufacturing machine.

More specifically, the invention relates to a machine for assembling radiator fins with the tubes normally used for circulating the cooling liquids in a radiator.

It is a prime object of this invention to provide an improved radiator assembling machine for assembling radiator parts such as tubes and fins, the machine including provisions for cutting and simultaneously piercing fin stock during the assembling of the fins with the tubes.

A still further object is to provide a radiator assembling machine, the machine including a reciprocating ram adapted to shear fin stock to length, the machine including a pair of guide elements forming a track on which the fin stock is supported, the guide elements being pivotally connected for movement out of the path of travel of the ram when the ram is reciprocated.

Still another object is to provide a radiator machine having a ram provided with oppositely disposed cutting elements, the cutting elements operating to shear stock to length during the operation of assembling radiator fins with cooling tubes.

A still further object is to provide a magazine for holding a plurality of radiator tubes in an upright position in a radiator manufacturing machine, the magazine including provisions for quickly attaching and detaching the same from a supporting platen provided on the machine.

A still further object is to provide a radiator manufacturing machine having provisions for assembling radiator fins with cooling tubes, the machine further including a magazine or container from which spacers may be simultaneously fed between the fins during the assembling operation.

A still further object is to provide a radiator machine having provisions for assembling radiator fins and tubes, the machine including a table which supports a magazine within which the tubes and fins are held in assembly, the table being positioned adjacent to a container having a plurality of spacers therein, the spacers being arranged so that an actuating mechanism feeds and moves the spacers into position between the radiator fins.

These and other objects will become more readily apparent from a reading of the description and operation when examined in connection with the disclosures shown in the accompanying sheets of drawings.

In the drawings:

2

Figure 9 is a front elevational view of a radiator magazine.

Figure 10 is a cross-sectional view through a radiator magazine, the view being taken along the line 10—10 of Figure 9.

Figure 11 is an end elevational view of the radiator magazine shown in Figure 9.

Figure 12 is a detailed plan view of a spacer comb.

Figure 13 is an enlarged end view in elevation of the spacer comb shown in Figure 12.

Figure 14 is a detailed plan view of an actuating cam or plate.

Figure 15 is a side elevational view of the cam plate shown in Figure 14.

Figure 1:
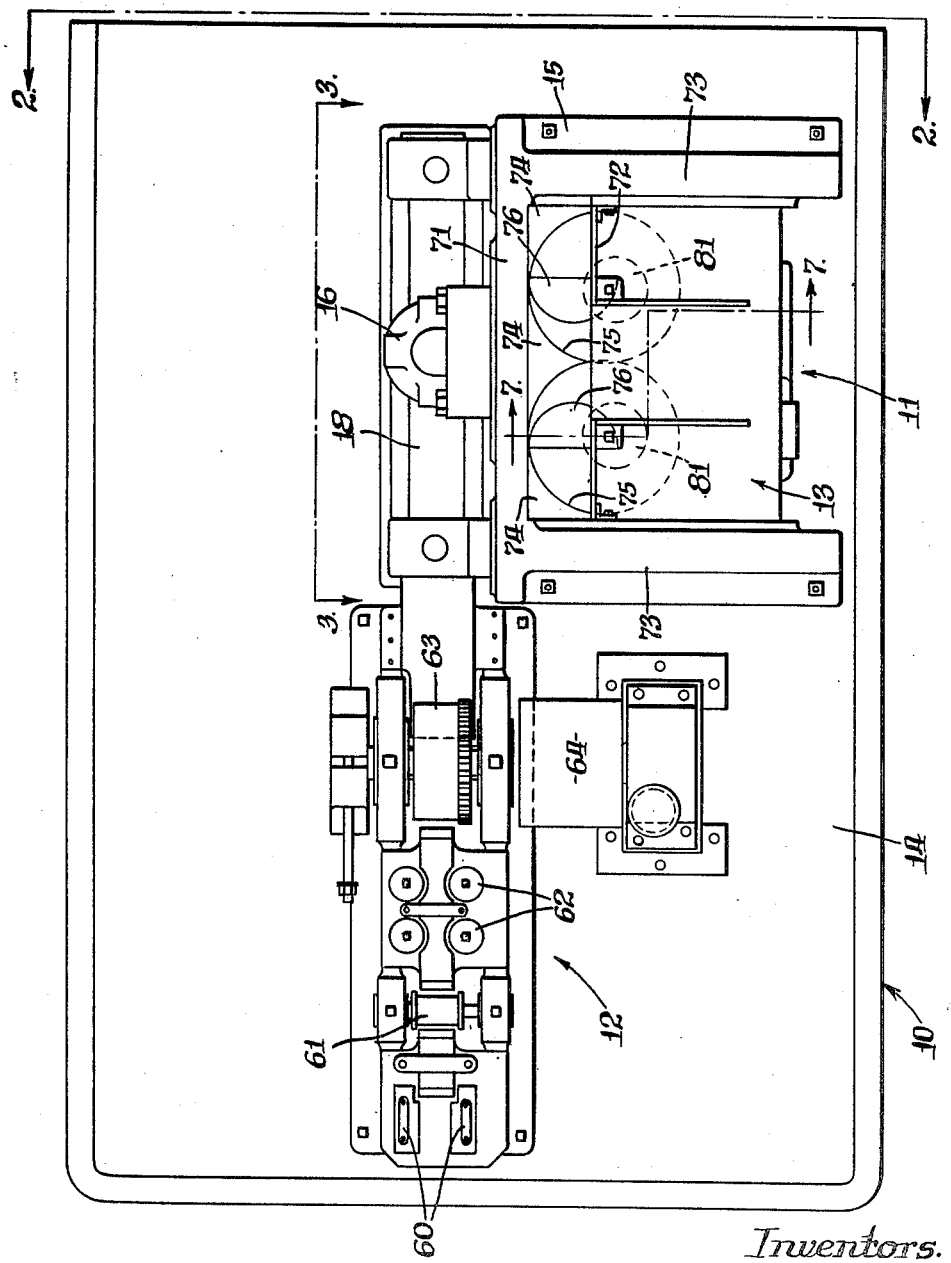
Figure 1 is a plan view of a radiator manufacturing arrangement showing a radiator manufacturing machine and a device for feeding fin stock thereto.

Referring now particularly to Figure 1, a radiator manufacturing arrangement is generally designated by the reference character 10. The arrangement 10 includes a radiator manufacturing machine 11 which is positioned immediately adjacent a strip feeding and forming mechanism 12. A spacer feeding unit is indicated at 13. A supporting table 14 is suitably arranged to support the arrangement 10.

*Description of the radiator manufacturing machine*

The radiator manufacturing machine 11 comprises a supporting structure 15 which is suitably supported on the table 14. The supporting structure 15 has mounted thereon, a hydraulic extensible mechanism 16 which has a piston rod 17 projecting outwardly therefrom. The piston rod 17 is connected to a ram 18 for reciprocating the same. A pair of guide brackets 19 are horizontally spaced with respect to each other, the brackets 19 being rigidly supported on the structure 15. Guide pins 20 are suitably connected to the guide brackets 19. The ram 18 is provided with a pair of horizontally spaced bearing sleeves 21 which engage the guide pins 20 in telescoping sliding relation.

Figure 5:
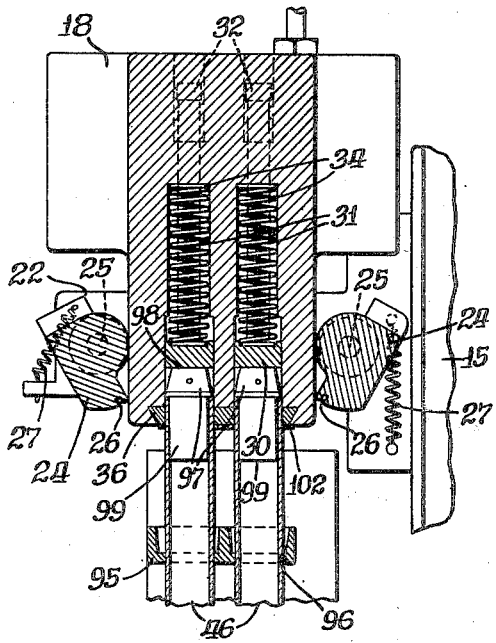
Figure 5 is a cross-sectional view through the ram and related structure of a radiator machine, the view being taken substantially along the line 5—5 of Figure 4.
Figure 6:
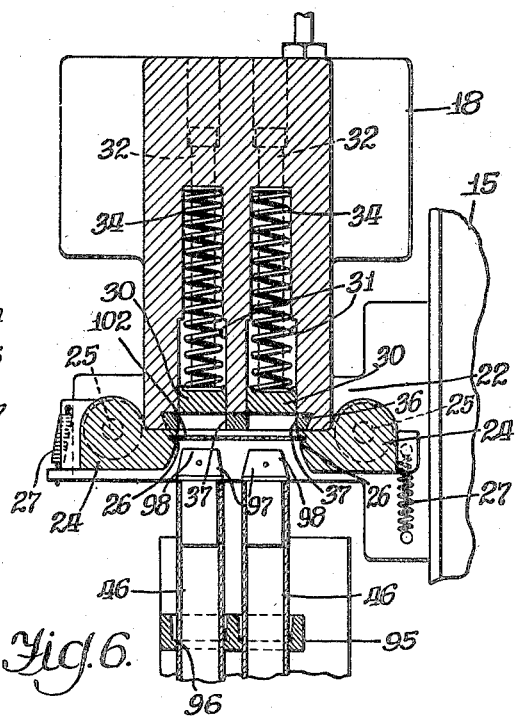
Figure 6 is a sectional view similar to Figure 5, the view showing one position in the operation of the ram.

Positioned immediately below the brackets 19 are projecting brackets 22, these brackets also being rigidly connected to the supporting structure 15. The projecting brackets 22 are provided with feed openings 23 through which radiator fin stock may be fed. As best shown in Figures 5 and 6, the projecting brackets 22 support a pair of pivoted track members 24 which are positioned on opposite sides of the ram 18. These track members 24 are hingedly or pivotally connected to the projecting brackets 22 as indicated at 25 for pivotal movement about horizontal axes.

As best shown in Figure 6, the track members 24 are positioned in the path of movement of the ram 18. The track members extend horizontally and are provided with horizontally extending recessed track portions 26. Springs 27 are connected to the track members 24 and to portions of the projecting brackets 22 for normally urging said track members into the position shown in Figure 6.

Figure 3:
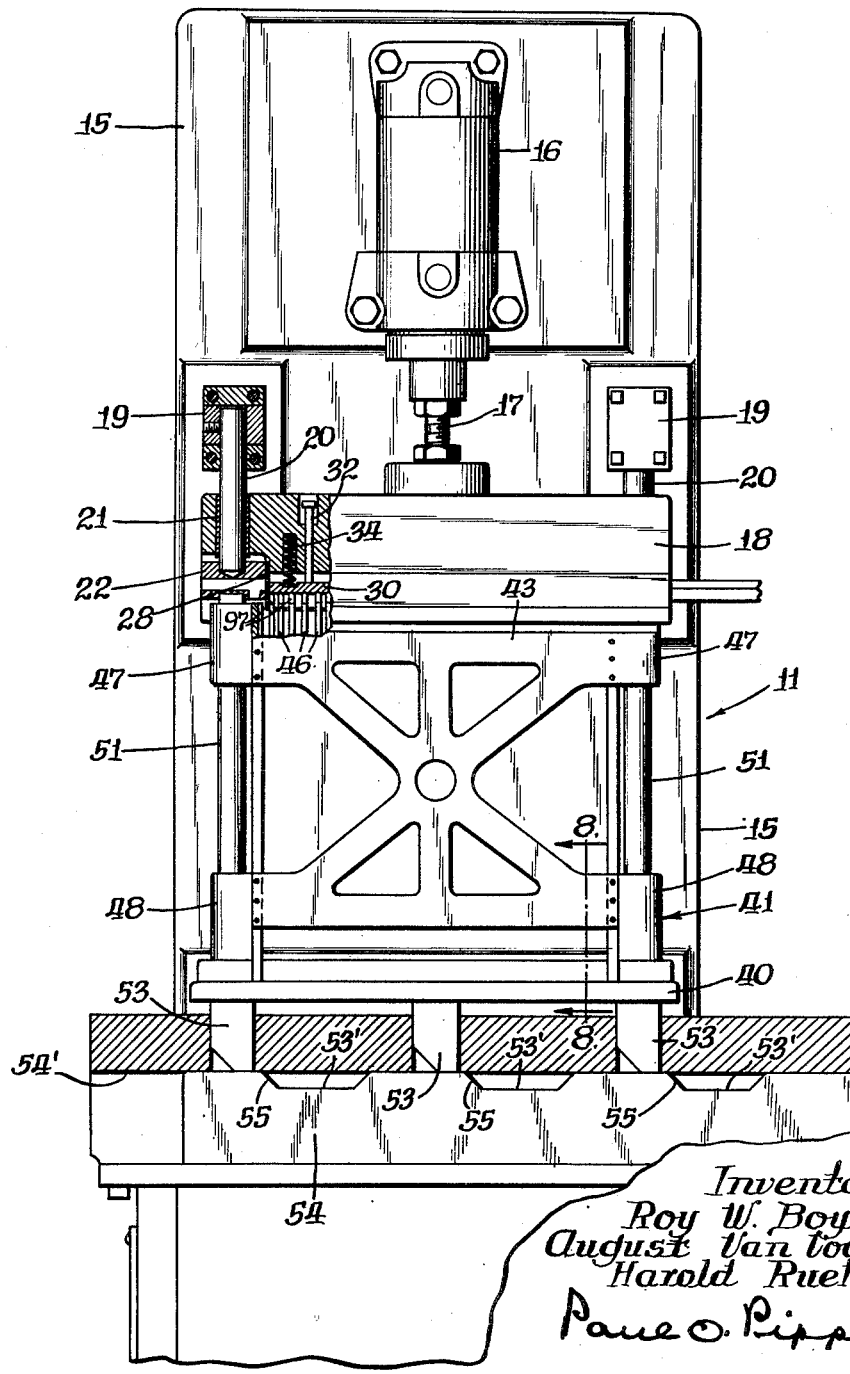
Figure 3 is a front view in elevation of a radiator manufacturing machine, the view being taken generally along the line 3—3 of Figure 1.
Figure 4:
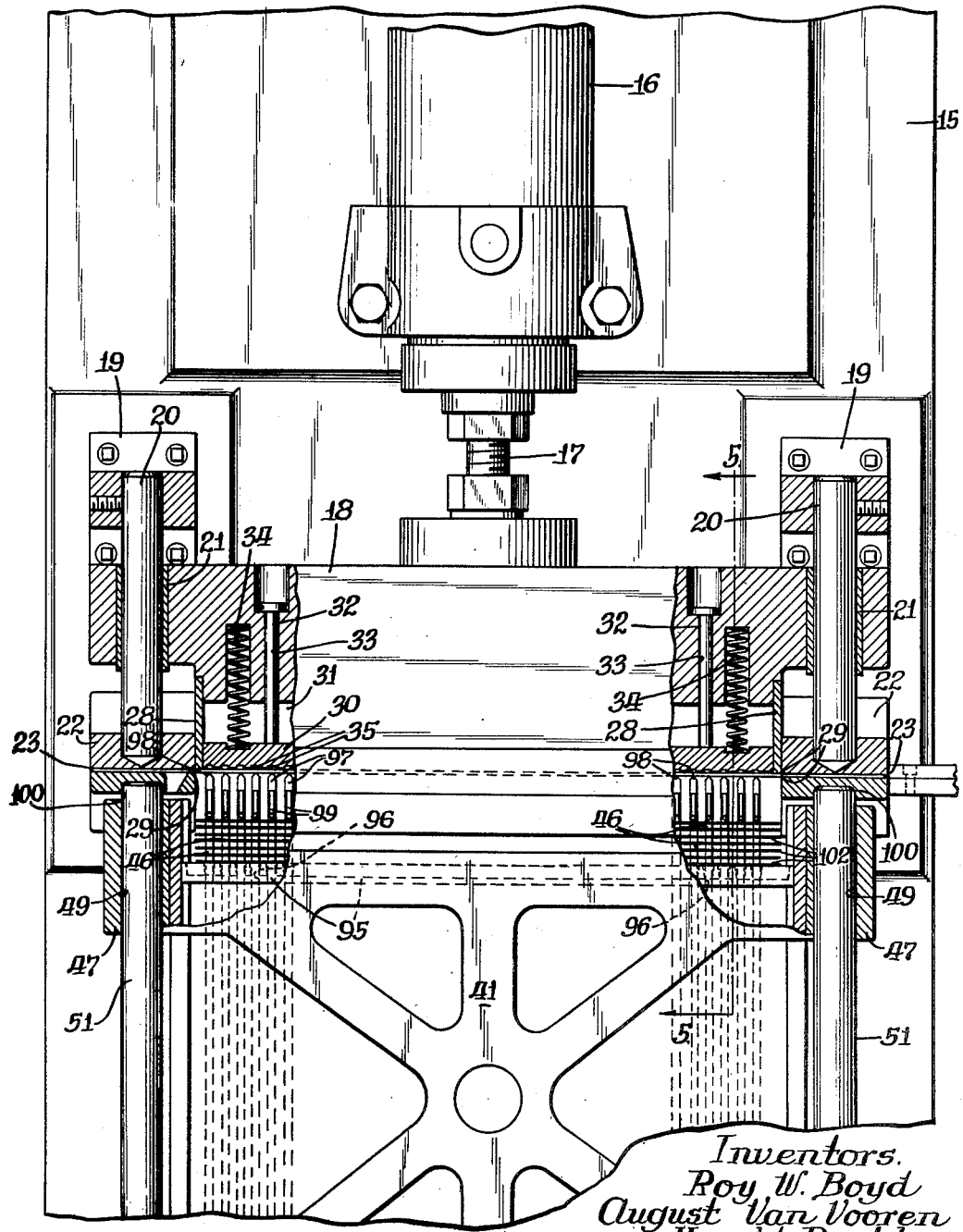
Figure 4 is a partially enlarged view in elevation of the machine shown in Figure 3.

As best shown in Figures 3 and 4, the ram 18 is provided at horizontally spaced ends with shear blades 28. During downward movement of the ram 18, the shear blades 28 cooperate with shear edges 29 formed on the projecting brackets 22.

As best shown in Figures 4, 5 and 6, a pair of stripper bars 30 are vertically slidable in grooves 31 of the ram 18. Slide bolts 32 are vertically slidable in vertical bores 33 formed in the ram 18. Springs 34 engage the stripper bars 30 and normally urge the bars into the position shown in Figure 4.

As best shown in Figures 5 and 6, a piercing plate 36 is recessed in the lower end of the ram 18, the piercing plate 36 including a plurality of apertures or openings 37. The piercing plate 36 is substantially coextensive with the horizontal length of the ram 18.

Figure 2:
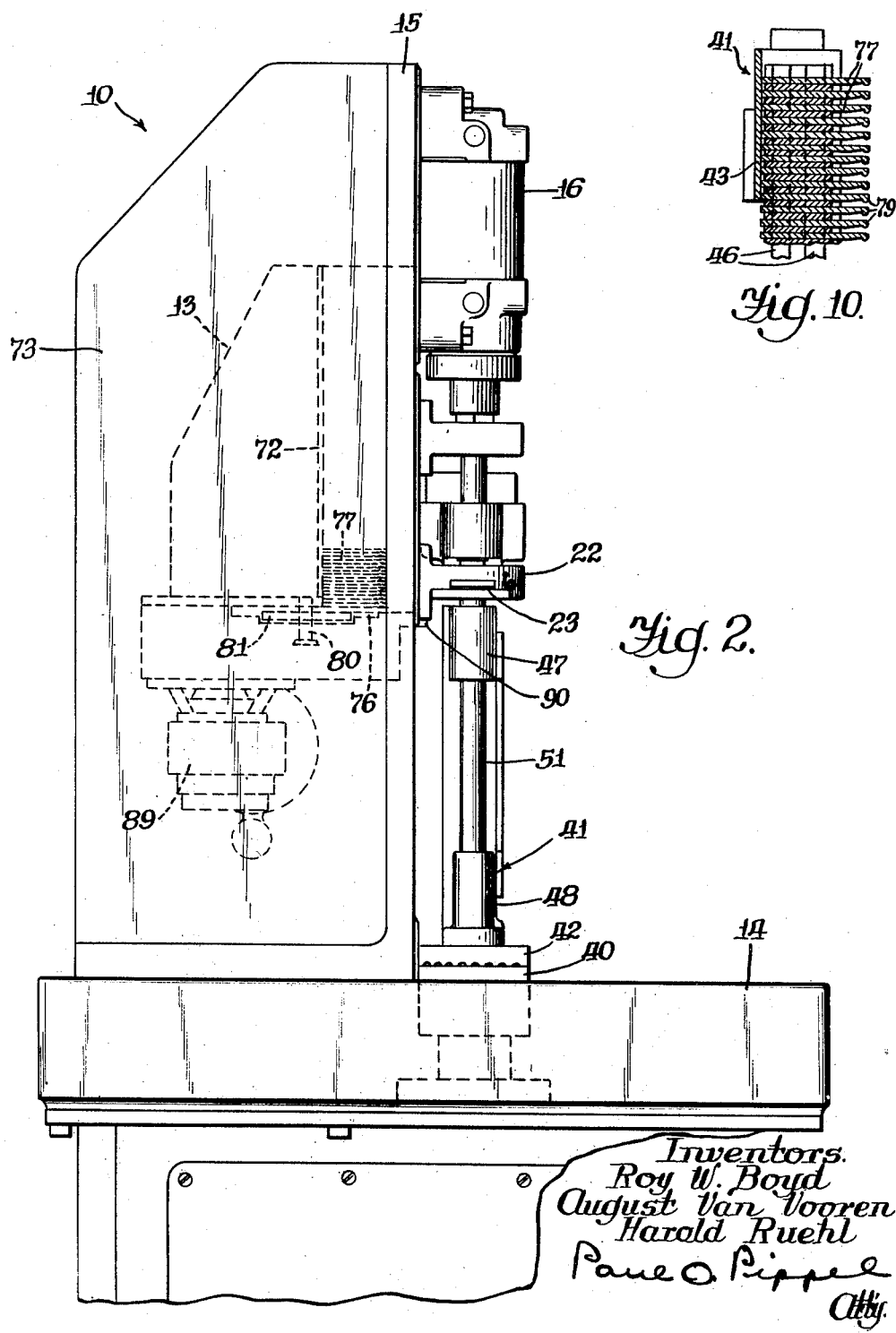
Figure 2 is a side elevational view of a radiator manufacturing machine, the view being taken substantially along the line 2—2 of Figure 1.
Figure 8:
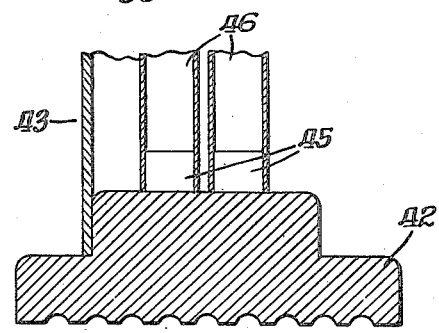
Figure 8 is a cross-sectional view through the lower end of a radiator magazine, the view being taken substantially along the line 8—8 of Figure 3.

As best shown in Figures 2 and 3, a platen or table 40 is positioned on the supporting table 14. A radiator magazine 41 is supported on the table 40. As best shown in Figures 8, 9 and 11, the radiator magazine 41 consists of a base or support 42 having one side wall 43 and two end walls 44. One side of the magazine is open for a purpose which will appear later. As indicated, in Figure 8, the base 42 is provided with a plurality of upwardly extending projections 45 which are so positioned that the lower ends of radiator tubes 46 may be slid over the projections and held thereon in mating or telescoping relation. Disposed on opposite sides of the radiator magazine 41 are upper guide members 47 and lower guide members 48, the guide members 47 and 48 are respectively provided with upper and lower bores 49 and 50. Lock pins 51 are vertically movable in the bores 49 and 50 for securing the radiator magazine 41 in position as shown in Figures 3 and 4. Springs 52 are provided in the bores 50 for normally urging the lock pins 51 upwardly.

In Figures 2, 3 and 4, the magazine 41 is shown in assembled position with respect to the radiator manufacturing machine 11. The magazine 41 is seated upon the platen or table 40, this table being provided with a plurality of downwardly extending cam pins 53. A cam actuating bar 54 is slidably positioned in a guideway 54' formed in the table 14. The cam actuating bar 54 is provided with a plurality of cams 55, these cams 55 cooperating with the cam pins 53 for raising or lowering the table 40.

*Description of strip feeding and forming mechanism*

A strip feeding and forming mechanism 12 does not form an inventive part of the present invention and will be described only in general terms.

The feeding and forming mechanism 12 is shown in Figure 1 and consisting of guide elements 60 which are positioned to feed a thin strip of fin stock to a crimping roll 61 which with bending rolls 62 forms overlapping edges on opposite sides of the fin stock. The fin stock is moved by a drive roller 63 which is driven by a suitable power means 64 for feeding the fin stock into the feed openings 23 of the machine.

*Description of spacer feeding unit*

As best shown in Figures 1, 2, 7 and 12 through 15 inclusive, the spacer feeding unit 13 consists of a container or rack 70 which is suitably supported on the table 14. The container or rack 70 consists of a front wall 71 as best shown in Figure 1, a rear wall 72 and end walls 73. The plan view of Figure 1 shows that the lower end of the rack 70 is provided with a plurality of spaced supports 74. The spaced supports 74 are actually formed from a flat surface from which radial sections have been machined to provide clearance for a pair of rotating cams 76. The rack 70 is normally provided with a plurality of stacked comb shaped spacers 77, these spacers 77 resting on the spaced supports 74.

As best shown in Figures 12 and 13, the combs 77 include a plurality of comb teeth 78. The comb teeth 78 include hook portions 79 which are effective in removing the spacers from the radiator magazine 41 after the radiator has been assembled. A spacer removing device is shown in applicant's co-pending application, Serial No. 248,925.

Figure 7:
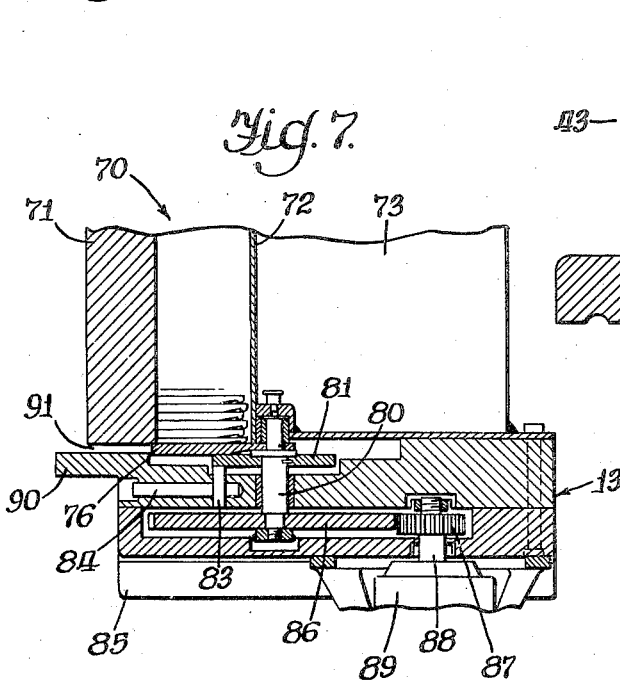
Figure 7 is a cross-sectional view through a spacer feeding unit, the view being taken substantially along line 7—7 of Figure 1.

As best shown in Figure 7, the cams 76 are positioned immediately below the rack 70. Each cam 76 is connected to a sectional shaft 80 to rotate therewith. Immediately below the cams 76 are provided actuator plates 81, a detail of which is shown in Figures 14 and 15. The actuator plates are each provided with an undercut cammed recess 82. The cammed recess 82 of each plate 81 is adapted to be engaged by a bearing wheel 83, which is shown in Figure 7.

It must be understood that one of these bearing wheels 83 is provided under each of the actuator plates 81. As shown in Figure 7 the bearing wheel 83 is pivoted on a shaft 84 firmly held in supporting structure 85 supported on the supporting structure 15. A gear 86 is provided for each of the shafts 80 for rotating the same. Each gear 86 is in mesh with a drive pinion 87 mounted for rotation on a shaft 88 rotated by motor 89.

It must be understood that the driving arrangement for each of the cams 76 may be as that shown in Figure 7 with separate power units or if desired, the cams 76 may be driven by the same power unit having suitable driving connecting provisions.

The supporting structure 85 consists of a projecting table section 90 which is vertically spaced from the front wall 71 to provide an opening 91 through which the spacer combs 77 may be fed to the radiator magazine 41.

As best shown in Figure 2, the table section 90 is positioned immediately adjacent the upper end of the magazine 41 and as radiator fins are assembled in the magazine, a spacer comb 77 will be fed between each fin.

The operation

In the operation, the magazine 41 is loaded with radiator tubes 46 as shown in Figure 8. The radiator tubes 46 are thus held in an upright position within the radiator magazine 41.

As best shown in Figures 3 and 4, a spacer plate 95 has a plurality of openings 96, these openings being positioned in alignment with the projections 45, the tubes 46 being held in the openings in relative laterally aligned relation. Thus, the spacer plate 95 maintains the tubes 46 in the upright proper relation for assembling.

As best shown in Figures 4, 5 and 6, the upper ends of the tubes 46 support piercing elements 97, these piercing elements having knife edges 98 and stems 99 which engage the upper ends of the tubes 46 in telescoping relation. Thus, the radiator magazine 41 is provided with the tubes 46 having the piercing elements 97 positioned thereon at their upper ends, the tubes being held properly in horizontally spaced relation by means of the spacer plate 95.

The magazine 41 is then taken and placed upon the platen table 40. The cam actuator 54 is positioned so that the table 40 is in seating relation on the top surface of the table 14. The pins 51 are placed in proper alignment with openings 100 formed in the projecting brackets 22. The cam actuator 54 is then moved longitudinally with respect to the guide slot 54′ so that the cams 55 engage the cam pins 53 for moving the table upwardly into the position shown in Figure 3. The pins 51 are now in telescopingly latched engagement with the openings 100. The magazine 41 is now held securely in place on the platen 40 and the machine is ready for operation.

Fin stock is now fed from the strip feeding and forming mechanism 12 into the opening 23 nearest the said mechanism. The fin stock has its opposite edges disposed in the recessed track portions 26 and the stock is held immediate below the ram 18 by means of the track members 24. This is best shown in Figure 6. The fin stock is indicated by the reference character 102, this fin stock also extending through the opening 23 provided on the other side of the machine.

The machine is now placed in operation, the ram 18 is lowered by means of the hydraulic unit 16 and as best shown in Figures 4 and 5, the fin stock 102 is sheared to length by means of the cutter blades 28 which cooperate with the cutting edges 29. As the ram 18 progresses down, the piercing plate 36, which has its openings 37 in alignment with the cutting edges 98 of the piercing elements 97, presses the fin stock 102 over the piercing members 97, whereupon the fin stock 102 is pierced and simultaneously threaded or pressed over the liquid circulating tubes 46. Thus, the fin stock is cut to length and pressed and threaded over the tubes in substantially a simultaneous operation.

After each fin has thus been cut and assembled on the tubes, it is of course necessary to provide a spacer immediately over the top of the last fin assembled so that proper spacing of the fins may be maintained. The spacer feeding unit 13 accomplishes this operation.

As best shown in Figures 1 and 7, the rack 70 is provided with a plurality of stacked comb spacers 77, these spacers 77 resting upon the spaced supports 74 shown in Figure 1. The spaced supports 74 have their upper horizontal surfaces disposed at the same elevation as the upper surface of the table 90. As the cams 76 are rotated in synchronized relation with the operation of the radiator assembling machine, the cams 76 are moved from the position shown in Figure 7. The cam recess 82 on the actuating plate 81 is so arranged that as the cam 76 is rotated, the shaft 80, the plate 81 and the cam 76 will drop downwardly as soon as the bearing wheel 83 engages the recess 82. As the cams 76 are thus moved downwardly and rotated simultaneously the comb spacers 77 all drop as a unit, the lowermost of the combs being thus seated upon the spaced supports 74. The lowermost spacer 77 now is resting upon the spaced supports 74 in the path of movement of the cams 76. As the cams 76 are rotated back to the position shown in Figure 7, the cams engage the comb 77 and shove the same through the space 91 and across the table section 90. Immediately thereafter, the cams 76, the plates 81 and shafts 80 again are lowered since the bearing wheels again ride in the recesses 82 so that the combs can again drop down and be supported on the spaced supports 74 for subsequent ejection through the opening 91. Upon this continued operation, the comb which is lying on the table 90 is shoved into the magazine 41 by the next succeeding comb which is fed from the rack 70.

The spacer feeding unit is so coordinated with the operation of the radiator manufacturing machine that as each fin is assembled with the upright tubes a comb is laid on top of each fin and thus the succeeding fin which is assembled is properly spaced from the next fin.

It can be seen that the purpose of the recess 82 in the actuator plate 81 is to permit the cam to be lowered at the strategic moment so that the combs can be lowered on to the supports 74 as a unitary structure whereupon cocking of the combs and improper alignment is prevented. Thus, it can be seen that proper provisions have been made to feed said comb spacers into the radiator machine at the necessary time so that the fins are properly spaced with respect to each other. A sectional view through a magazine having the fins, tubes and spacers assembled is shown in Figure 10.

In operation, the sequence of assembling is quite rapid and the piercing and cutting of the fins is substantially a simultaneous operation. During operation the ram 18 descends and engages the inwardly projecting portions of the track members 24 and pivots them out of path of the ram. This is a prime feature of the invention since it permits the fin to be held in proper relation to the ram until the ram is ready to pierce the stock and to thread the same over the tubes.

As best shown in Figure 5, as soon as the fin stock 102 has been pierced, the stripper bars 30 are forced into engagement with the cutting edges 98 of the piercing elements 97. As the ram now returns to the position shown in Figure 6, the piercing elements 97 are resiliently held by means of the stripper bars 30 in their proper relation with respect to the tubes 46. Thus, during retraction of the ram, the piercing elements 30 are maintained on the upper ends of the tubes.

After a radiator has been fully assembled, the magazine 41 may quickly be detached from the machine. This is accomplished by simply moving the cam actuator 54 to the left as shown in Figure 3, whereupon pins 53 are lowered into recesses 53' thus lowering the table 40 whereupon it rests upon the upper surface 14. The lock pins 51 are now pressed downwardly out of engagement with the bores 109 and the lock pins 51 are forced downwardly against the springs 52' whereupon the magazine 41 can be moved away from the machine and a new magazine can be placed into the position.

It can now be seen that the objects of the invention have been fully achieved and a novel radiator machine has been provided, this machine replacing the tedious practices of assembling radiators by hand. Thus, the radiator fins can be pierced, cut to length and threaded onto the tubes in an almost simultaneous operation. A synchronized spacer feed unit is provided to space the fins in proper position. By the utilization of a quickly attachable and detachable magazine, the assembled radiator can be quickly removed from the machine and a new magazine can be inserted.

It must be understood that changes may be made in the design without departing from the spirit of the invention as disclosed nor from the scope thereof as defined in the appended claims.

What is claimed is:

1. A radiator manufacturing machine comprising a supporting structure, a ram positioned for reciprocation on said supporting structure, means for reciprocating said ram, a platen positioned beneath said ram, a radiator magazine positioned on said platen, said magazine including a support for supporting a plurality of radiator tubes, a track for feeding fin stock between the ram and the magazine, said track including a pair of substantially parallel transversely spaced track members positioned below said ram, means hingedly supporting said track members on said supporting structure, said track members each including a recess for engaging oppositely disposed edges of fin stock, said track members being movable by said ram outwardly from the path of travel of said ram, shearing members disposed at opposite ends of said feeding track, shearing blades supported in transversely spaced relation on said ram, said blades being movable with said ram for engaging said shearing members and for shearing fin stock disposed between the shearing members to length, a plurality of spear tips adapted to be supported on the upper ends of tubes supported in the magazine, a piercing plate supported on said ram for reciprocation therewith, said piercing plate including a plurality of openings in aligned relation with respect to said spear tips, said piercing plate being adapted to engage the fin stock during movement of the ram to force the same over the spear tips whereby the fin stock is pierced and simultaneously assembled on tubes carried by said magazine, a stripper plate supported on said ram for movement therewith, said stripper plate including resilient means for resiliently urging the stripper plate into engagement with said spear tips during certain positions of said ram, a spacer magazine positioned adjacent said ram, comb shaped spacers disposed in said spacer magazine, and means for removing a spacer from the spacer magazine and for inserting a spacer over each fin as it is assembled on the tubes carried by the radiator magazine.

2. A radiator manufacturing machine comprising a supporting structure, a ram positioned for reciprocation on said supporting structure, means for reciprocating said ram, a platen positioned beneath said ram, a radiator magazine positioned on said platen, said magazine including a support for supporting a plurality of radiator tubes, a track for feeding fin stock between the ram and the magazine, said track including a pair of substantially parallel transversely spaced track members positioned below said ram, means hingedly supporting said track members on said supporting structure, said track members each including a recess for engaging and supporting oppositely disposed edges of fin stock, said track members being movable by said ram outwardly from the path of travel of said ram, shearing members disposed at opposite ends of said feeding track, shearing blades supported in transversely spaced relation on said ram, said blades being movable with said ram for engaging said shearing members and for shearing fin stock disposed between the shearing members to length, a plurality of spear tips adapted to be supported on the upper ends of tubes supported in the magazine, a piercing plate supported on said ram for reciprocation therewith, said piercing plate including a plurality of openings in aligned relation with respect to said spear tips, said piercing plate being adapted to engage the fin stock during movement of the ram to force the same over the spear tips whereby the fin stock is pierced and simultaneously assembled on tubes carried by said magazine, and a stripper plate supported on said ram for movement therewith, said stripper plate including resilient means for resiliently urging the stripper plate into engagement with said spear tips during certain positions of said ram.

3. A radiator manufacturing machine comprising a supporting structure, a ram positioned for reciprocation on said supporting structure, means for reciprocating said ram, a platen positioned beneath said ram, a radiator magazine positioned on said platen, said magazine including a support for supporting a plurality of radiator tubes, a track for feeding fin stock between the ram and the magazine, said track including a pair of substantially parallel transversely spaced track members positioned below said ram, said track members each including means for supporting oppositely disposed edges of fin stock, said track members being movable by said ram outwardly from the path of travel of said ram, shearing members disposed at opposite ends of said feeding track, shearing blades supported in transversely spaced relation on said ram, said blades being movable with said ram for engaging said shearing members and for shearing fin stock disposed between the shearing members to length, a plurality of piercing elements adapted to be supported on the upper ends of tubes supported in the magazine, a piercing plate supported on said ram for reciprocation therewith, said piercing plate including a plurality of openings in aligned relation with respect to said piercing elements, said piercing plate being adapted to engage the fin stock during movement of the ram to force the same over the piercing elements whereby the fin stock is pierced and simultaneously assembled on tubes carried by said magazine, and a stripper plate supported on said ram for movement therewith, said stripper plate including resilient means for resiliently urging the stripping plate into engagement with said spear tips during certain positions of said ram.

4. A radiator manufacturing machine comprising a supporting structure, a ram positioned for reciprocation on said supporting structure, means for reciprocating said ram, a platen positioned beneath said ram, a radiator magazine positioned on said platen, said magazine including a support for supporting a plurality of radiator tubes, a track for feeding fin stock between the ram and the magazine, said track including a pair of substantially parallel transversely spaced track members positioned below said ram, said track members each including means for supporting oppositely disposed edges of fin stock, said track members being movable by said ram outwardly from the path of travel of said ram, shearing members disposed at opposite ends of said feeding track, shearing blades supported in transversely spaced relation, said blades being movable with said ram for engaging said shearing members and for shearing fin stock disposed between the shearing members to length, a plurality of piercing elements adapted to be supported on the upper ends of tubes supported in the magazine, and a piercing plate supported on said ram for reciprocation therewith, said piercing plate including a plurality of openings in aligned relation with respect to said piercing elements, said piercing plate being adapted to engage the fin stock during movement of the ram to force the same over the piercing elements whereby the fin stock is pierced and simultaneously assembled on tubes carried by said magazine.

5. A radiator manufacturing machine comprising a supporting structure, a ram positioned for reciprocation on said supporting structure, a platen on said supporting structure positioned beneath said ram, a radiator magazine removably positioned on said ram, said magazine including supports adapted to support a plurality of radiator tubes with their upper ends normally vertically spaced from the ram, means for feeding fin stock between the ram and the magazine, shearing means disposed on opposite sides of the ram for shearing the fin stock during reciprocation of said ram, piercing elements adapted to be supported below the ram by the radiator tubes, a piercing plate supported on the ram for reciprocation therewith, said piercing plate including openings adapted to register with the piercing elements, means for reciprocating said ram whereby said piercing plate presses said fin stock over the piercing elements and over tubes carried in the magazine whereby the fin stock is assembled with the tubes, a spacer feeding device positioned adjacent said magazine, said spacer feeding device including a plurality of comb shaped spacers, and means on said feeding device for feeding spacers into the magazine whereby a spacer is positioned between each fin stock.

6. A radiator manufacturing machine in accordance with claim 5, the spacer feeding device including a rotatable cam engageable with a spacer for moving the same horizontally into position within the magazine.

7. A radiator manufacturing machine comprising a supporting structure, a ram positioned for reciprocation on said supporting structure, a platen on said supporting structure positioned beneath said ram, a radiator magazine removably positioned on said ram, said magazine including supports adapted to support a plurality of radiator tubes with their upper ends vertically spaced from the ram, means for feeding fin stock between the ram and the magazine, shearing means disposed on opposite sides of the ram for shearing the fin stock during reciprocation of said ram, piercing elements adapted to be supported below the ram by the radiator tubes, a piercing plate supported on the ram for reciprocation therewith, said piercing plate including openings adapted to register with the piercing elements, and means for reciprocating said ram whereby said piercing plate presses said fin stock over the piercing elements and over tubes carried in the magazine whereby the fin stock is assembled with the tubes.

8. A radiator manufacturing machine comprising a supporting structure, a ram positioned for reciprocation on said supporting structure, a platen on said supporting structure positioned beneath said ram, a radiator magazine positioned on said ram, said magazine including means adapted to support a plurality of radiator tubes with their upper ends vertically spaced from the ram, means for feeding fin stock between the ram and the magazine, shearing means disposed on said ram for shearing the fin stock during reciprocation of said ram, piercing elements adapted to be supported below the ram by the radiator tubes, a piercing plate supported on the ram for reciprocation therewith, said piercing plate including openings adapted to register with the piercing elements, means for reciprocating said ram whereby said piercing plate presses said fin stock over the piercing elements and over tubes carried in the magazine whereby the fin stock is assembled with the tubes, a spacer feeding device positioned adjacent said magazine, said spacer feeding device including a plurality of comb shaped spacers, and means on said feeding device for feeding a spacer into the magazine whereby a spacer is positioned between each fin stock.

9. A radiator manufacturing machine comprising a supporting structure, a ram positioned for reciprocation on said supporting structure, a platen adjacent said supporting structure positioned below said ram, means for supporting a plurality of radiator tubes on said platen in upright horizontally spaced relation, means for feeding fin stock into said machine between the upper ends of the tubes and said ram, and shearing elements disposed on opposite sides of the ram for shearing the fin stock, and means on said ram for simultaneously assembling said sheared fin stock over the tubes during movement of said ram.

10. A radiator manufacturing machine in accordance with claim 9, including a plurality of piercing elements adapted to be supported by tubes supported on the platen and a piercing plate on said ram, said piercing plate including openings in vertical alignment with the piercing elements whereby said fin stock is engaged by the piercing plate during movement of the ram and threaded over the tubes in assembled relation.

11. A radiator manufacturing machine in accordance with claim 10, including a stripper plate resiliently supported on said ram, said stripper plate being in engagement with the piercing elements for retaining them in position during upward travel of said ram.

12. A radiator manufacturing machine comprising a supporting structure, a ram positioned for reciprocation on said supporting structure, a platen adjacent said supporting structure, means for feeding fin stock between the platen and the ram, shear means between the ram and the supporting structure cooperating to shear the fin stock to length during movement of the ram, a radiator magazine positioned on said platen, said radiator magazine including means for removably supporting a plurality of radiator tubes, means removably connecting said magazine in position on said platen including portions on said magazine adapted to engage said supporting structure in locking relation, and cam actuated means engaging said magazine for moving said magazine into locking engagement during one position and for moving said magazine out of locking relation in a second position.

13. A radiator manufacturing machine comprising a supporting structure, a ram reciprocably positioned on said supporting structure, a table positioned below said ram, said table including means for supporting a plurality of radiator tubes in upright relation, piercing elements adapted to be supported on the upper ends of said upright tubes, means for feeding fin stock between said ram and the piercing elements, shearing elements on said ram and on said supporting structure cooperating during movement of said ram for shearing the fin stock to length, and apertured means movable with said ram for engaging the fin stock, said apertured means being adapted to engage the piercing elements in mating relation and to thread the fin stock into said radiator tubes.

14. A radiator manufacturing machine comprising a supporting structure, a reciprocable ram mounted on said supporting structure, a table positioned below said ram, means on said table for supporting a plurality of radiator tubes in an upright position on said table, means for reciprocating said ram whereby a fin positioned below said ram is assembled with said tubes, a spacer container positioned adjacent said table, said container being open at its lower end and being adapted to contain a plurality of comb shaped spacer elements, means for feeding individual spacer elements between the assembled fins comprising a pair of supports positioned below the open lower end of said magazine, said supports being adapted to receive and support the spacer comb in position for feeding, a pair of cams positioned for rotation about vertical axes, said cams being positioned above said supports, and means for rotating said cams whereby said cams engage the spacer combs individually and move the individual comb horizontally into position over a fin assembled with the tubes.

15. A radiator manufacturing machine comprising a supporting structure, a reciprocable ram mounted on said supporting structure, a table positioned below said ram, means on said table for supporting a plurality of radiator tubes in an upright position on said table, means for reciprocating said ram whereby a fin positioned below said ram is assembled with said tubes, a spacer container positioned adjacent said table, said container being open at its lower end and being adapted to contain a plurality of comb shaped spacer elements, and means for feeding individual spacer elements between the assembled fins.

16. A radiator manufacturing machine comprising a supporting structure, a reciprocable ram mounted on said supporting structure, a table positioned below said ram, means on said table for supporting a plurality of radiator tubes in an upright position on said table, means for reciprocating said ram whereby a fin positioned below said ram is assembled with said tubes, a spacer container positioned adjacent to said table, a plurality of spacer combs in said container, said container having an opening to permit the discharge of spacer combs from said container, a support adjacent the opening in the container for receiving and supporting the combs, a rotatable cam, and means for rotating said cam into engagement with said spacer comb whereby the spacer comb is discharged in a horizontal direction on top of a fin assembled with the radiator tubes.

17. A radiator manufacturing machine comprising a supporting structure, a reciprocable ram mounted on said supporting structure, a table positioned below said ram, means on said table for supporting a plurality of radiator tubes in an upright position on said table, means for reciprocating said ram whereby a fin positioned below said ram is assembled with said tubes, a spacer container positioned adjacent to said table, a plurality of spacer combs in said container, said container having an opening to permit the discharge of spacer combs from said container, a support adjacent the opening in the container for receiving and supporting the combs, and actuating means for engaging said spacer combs to discharge the same from the container whereby the spacer comb is discharged in a horizontal direction on top of a fin assembled with the radiator tubes.

18. A radiator manufacturing machine comprising a supporting structure, a ram supported on said supporting structure, means connected to said ram for reciprocating the same with respect to said supporting structure, a table positioned adjacent to said ram, means on said table for supporting a plurality of radiator tubes with the free ends of said tubes positioned in proximity to said ram, a plurality of piercing elements supported on the free ends of said tubes, means for feeding fin stock between the piercing elements and said ram, shearing elements operatively connected to said ram for shearing fin stock to length, and means on said ram adapted to engage said fin stock to move the same into engagement with said piercing elements and to thread said fin stock on said radiator tubes.

References Cited in the file of this patent

UNITED STATES PATENTS

| Number | Name | Date |
|---|---|---|
| 875,746 | Stolp | Jan. 7, 1908 |
| 2,006,383 | Boerger | July 2, 1935 |
| 2,156,538 | Maynes | May 2, 1939 |
| 2,224,549 | O'Brien | Dec. 10, 1940 |